(12) United States Patent  
Baumann

(10) Patent No.: US 9,010,767 B2
(45) Date of Patent: Apr. 21, 2015

(54) COLLET CHUCK

(75) Inventor: Hans Baumann, Sontheim (DE)

(73) Assignee: Roehm GmbH, Sontheim (DE)

( * ) Notice: Subject to any disclaimer, the term of this patent is extended or adjusted under 35 U.S.C. 154(b) by 657 days.

(21) Appl. No.: 13/220,746

(22) Filed: Aug. 30, 2011

(65) Prior Publication Data

US 2012/0061925 A1 Mar. 15, 2012

(30) Foreign Application Priority Data

Sep. 13, 2010 (DE) .................. 10 2010 037 485

(51) Int. Cl.
*B23B 31/20* (2006.01)
*B23B 31/00* (2006.01)

(52) U.S. Cl.
CPC ......... *B23B 31/201* (2013.01); *B23B 2231/201* (2013.01); *B23B 31/001* (2013.01); *B23B 2231/2081* (2013.01); *B23B 2260/07* (2013.01); *B23B 2231/2083* (2013.01)

(58) Field of Classification Search
CPC B23B 31/20; B23B 31/201; B23B 2231/201; B23B 2231/2081; B23B 2231/2083; B23B 2260/07
USPC ............. 279/42, 43.2, 52, 150, 46.3, 51, 147
See application file for complete search history.

(56) References Cited

U.S. PATENT DOCUMENTS

| 1,094,346 | A | * | 4/1914 | Schellenbach | 279/51 |
| 3,030,119 | A | * | 4/1962 | Myers | 279/4.08 |
| 3,111,862 | A | * | 11/1963 | Eady et al. | 74/606 R |
| 3,539,193 | A | * | 11/1970 | Parsons | 279/51 |
| 3,802,713 | A | | 4/1974 | Levy | |
| 4,602,798 | A | * | 7/1986 | Wettstein | 279/48 |
| 6,572,119 | B2 | | 6/2003 | Selb | |
| 2002/0053772 | A1 | | 5/2002 | Selb | |
| 2012/0025475 | A1 | | 2/2012 | Mack | |

FOREIGN PATENT DOCUMENTS

DE 102009003802 A 10/2010
WO WO 0134332 A1 * 5/2001

* cited by examiner

*Primary Examiner* — Eric A Gates
*Assistant Examiner* — Chwen-Wei Su
(74) *Attorney, Agent, or Firm* — Andrew Wilford

(57) ABSTRACT

A chuck has a chuck body at least generally centered on a body axis and a collet in the hole and having an external screwthread. A ring axially nondisplaceable in the body has an internal screwthread engaging the screwthread of the collet and external gear teeth. The body is formed with a radially outwardly open cavity seat in which some of the teeth of the ring are exposed. A gear fitted in the seat meshes with the ring teeth and can rotate about a drive axis not parallel to the body axis to rotate the ring about the body axis. According to the invention a sleeve on the chuck extends axially across and covers the seat to retain the gear therein and is formed with a through going aperture through which a tool can fit to engage and rotate the gear.

14 Claims, 5 Drawing Sheets

COLLET CHUCK

FIELD OF THE INVENTION

The present invention relates to a chuck. More particularly this invention concerns a collet chuck.

BACKGROUND OF THE INVENTION

A standard chuck has a chuck body with a conically tapered centering hole holding a collet shaped as a sleeve with normally cylindrical inner surface and an at least partially frustoconical coaxial outer surface also provided with a screwthread. An angle drive has a threaded ring that engages with the screwthread and is axially nondisplaceable in to the chuck body and coaxial to the collet and that can be driven by a drive gear or rotation about a drive axis not parallel to the chuck axis.

Such a chuck is known for example from U.S. Pat. No. 6,572,119, where a bore extending tangentially to the threaded ring forms a seat in the chuck body that holds an angle drive for the threaded ring. If it is necessary here to replace the angle drive due to wear, it is very complicated to remove the components mounted in the chuck body.

A variant of an above-mentioned chuck is illustrated in German patent application DE 10 2009 003 802. Here, as in the above-mentioned reference, a bore for the angle drive is provided in the form of a seat in the chuck body. This bore can be formed only with difficulty because an internal cavity has to be formed to provide sufficient space for the drive gear and the threaded ring of the angle drive.

Here, in addition, both chucks lack an additional means securing the angle drive radially. During drilling, very strong centrifugal forces act on components that are not centered on the chuck axis.

OBJECTS OF THE INVENTION

It is therefore an object of the present invention to provide an improved chuck.

Another object is the provision of such an improved chuck that overcomes the above-given disadvantages, in particular that is as simple as possible and that has a radially secured angle drive.

SUMMARY OF THE INVENTION

A chuck has according to the invention a chuck body at least generally centered on a body axis and having a forwardly open and frustoconically forwardly flaring inner surface portion, a clamping element or collet in the hole and having an external screwthread and an outer surface portion generally complementary with and engaging the hole surface portion so that axial rearward movement of the clamping element in the hole radially compresses the clamping element, and a ring axially nondisplaceable in the body, having an internal screwthread engaging the screwthread of the clamping element, and having external gear teeth so that rotation of the ring axially shifts the clamping element in the body. The body is formed with a radially outwardly open cavity seat in which some of the teeth of the ring are exposed. A gear fitted in the seat meshes with the ring teeth and can rotate about a drive axis not parallel to the body axis to rotate the ring about the body axis. According to the invention a sleeve on the chuck extends axially across and covers the seat to retain the gear therein and is formed with a through going aperture through which a tool can fit to engage and rotate the gear.

This configuration has the advantage that the angle drive is located in a gear seat that is enclosed by a gear sleeve provided with an aperture for a drive tool. The sleeve protects the angle drive against dirt and secures it in place. Moreover, a gear seat of this type can be easily formed during manufacturing because, for example, no hollow bodies have to be created from solid materials. A chuck of this type is very narrow.

Moreover, it is advantageous if the gear seat is part of the rear part, in particular if the gear seat opens radially of the chuck axis. During manufacturing of the rear part, a bore formed for supporting the gear can be easily executed. Likewise, installation of the angle drive near the rear part is useful in that the angle drive is positioned far away from the supported tool, so the degree of contamination of it is reduced.

Another advantage is associated with the formation of the gear sleeve and rear part as one piece. During manufacturing, the step of producing one of the components is eliminated. Also, an advantageous embodiment of the chuck is the integral formation of the gear seat enclosed by the gear sleeve together with the chuck body. Here, likewise, one manufacturing step is eliminated because one less component of the chuck needs to be manufactured. One-piece construction of the gear sleeve with the chuck body also protects against unnecessary contamination of the angle drive during drilling.

A particularly advantageous embodiment of the chuck is the releasable mounting of the gear sleeve on the chuck body. This makes assembly, maintenance and cleaning of the angle drive easier because in the uncovered state of the gear sleeve, the drive gear, threaded ring and gear seat are clearly accessible.

Furthermore, it is advantageous if an axial extension of the gear sleeve partly or completely encloses the chuck and/or the rear part. Here too, contamination of the angle drive is reduced.

If the gear sleeve is bent in at its end turned away from the centering hole, this guarantees an even tighter fit of the threaded sleeve with respect to axial movements. Also, shifting of the aperture for drive tools is reduced in this manner.

It is advantageous if the angle drive is formed as a drive having a bevel gear as drive gear. With a bevel gear, different orientations for the threaded receptacle can be implemented. Likewise, there is also the possibility of forming the angle drive with a worm gear as drive gear.

A further advantageous embodiment is the formation of the rear part as one piece with a tool spindle. This allows easy use on different chucks. In so doing, machining of workpieces can be reduced.

An advantageous embodiment of the invention is a clamp element formed as a tubular axially slotted collet. This ensures that the tool is securely surrounded when gripped and cannot be separated by hand.

If the collet has a rib on its outer wall at an axial spacing from its end, the collet is better guided in the chuck body and, in addition, seals the angle drive against contamination. If, at its end facing toward the rear, the collet also has a collar that can be inserted into the rear part, this collar also serves for guiding and sealing against contamination. If the length of the screwthread exceeds the length of the chord part of the threaded ring that engages with the screwthread, this also achieves the above-mentioned sealing effect against contamination.

BRIEF DESCRIPTION OF THE DRAWING

The above and other objects, features, and advantages will become more readily apparent from the following description, reference being made to the accompanying drawing in which.

DETAILED DESCRIPTION

Figure 1:
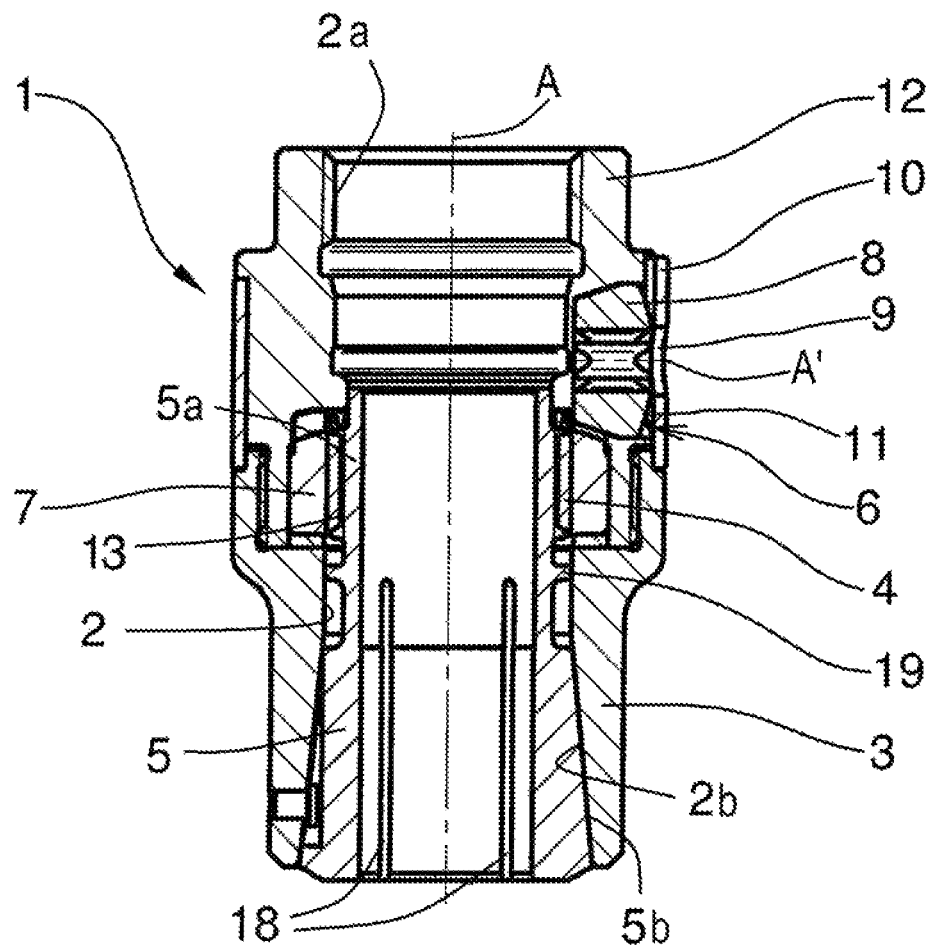
FIG. 1 is a longitudinal section through a chuck according to the invention.

As seen in FIGS. 1-7 a chuck 1 has a body 3 centered on an axis A and having a center hole 2 formed at a rear end 12 of the body 3 with a cylindrical and internally threaded upper end 2a adapted to fit an unillustrated drill spindle and at its lower front end with a frustoconical and downwardly flared surface 2b. A clamping element or collet 5 in this centering hole 2 has a cylindrical rear part 4a formed with a screwthread 4 in which an internal screwthread 13 of a threaded ring 7 engages that is axially nondisplaceable in the chuck body 3 and coaxial to the collet 5. The collet 5 here is formed with slots 18 filled with rubber to keep out particles.

The threaded ring 7 is part of an angle drive 6 with a bevel drive gear 8 received in a gear seat 11 formed in the chuck body 3. A sleeve 10 that is coaxial to the chuck axis A radially outwardly closes and covers the gear seat 11 and keeps contaminants out of the angle drive 6. The gear sleeve 10 is formed with an aperture 9 for an unillustrated drive tool, for instance an allen or hex wrench. In FIG. 1, the gear seat 11 is a cavity with a frustoconical and radially outwardly flared inner wall and is centered on an axis A' extending radially of the chuck axis A. The angle drive 6 is thus a bevel-gear drive comprised of the gear 8 and the threaded ring 7, here received in the rear part 12. The collet 5 here has on its outer surface between its rear and front parts 5a and 5b a radially outwardly projecting annular ridge 19.

Figure 3:
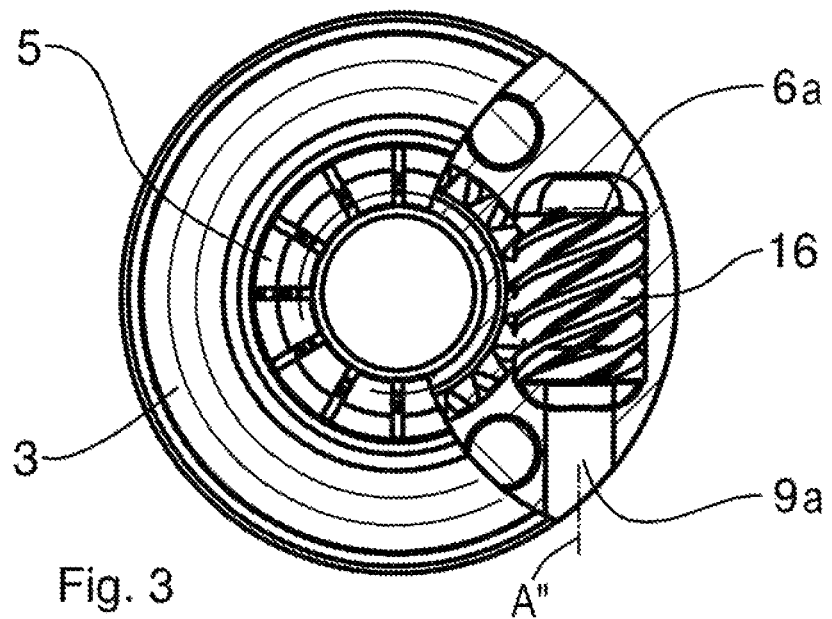
FIG. 3 is a partly sectional end view of the chuck of FIG. 2.
Figure 2:
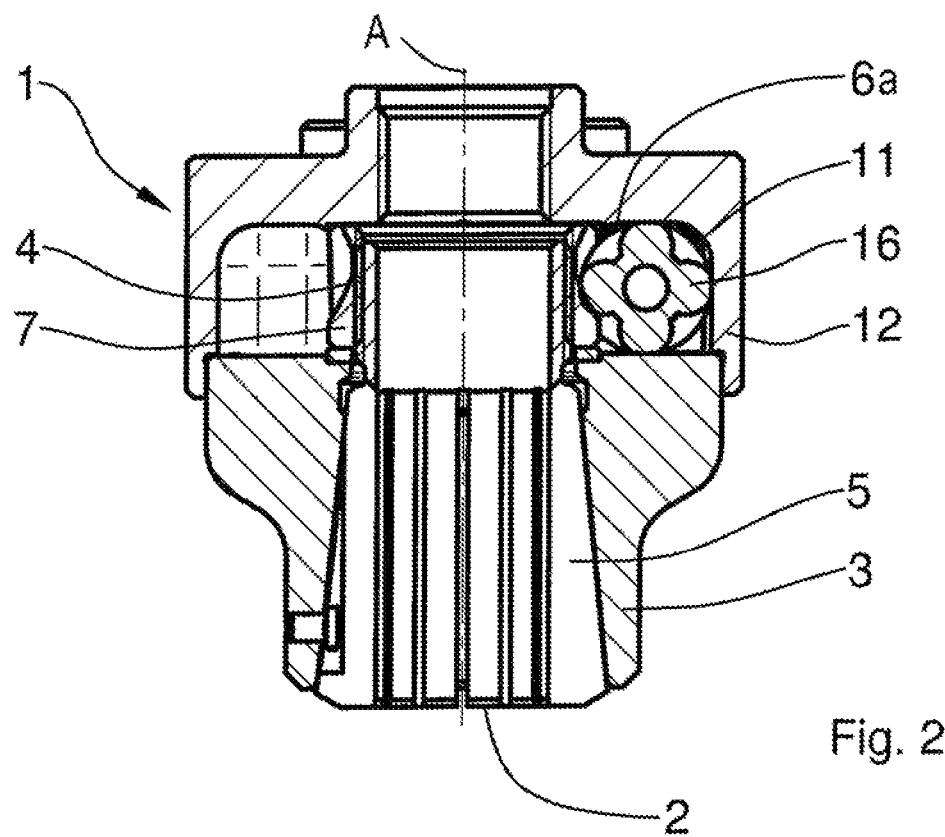
FIG. 2 is a longitudinal section through a second embodiment of the chuck.

FIG. 2 shows that the gear sleeve 10 and the rear part 12 are formed as one piece. As shown here, the angle drive 6a has a worm gear 16 instead of the drive gear 8. Here too, corresponding to FIG. 1, the gear seat 11 is part of the rear part 12. The worm gear 16 is centered on a tangential or sequential axis A'' that is offset from the axis A and lying in a plane perpendicular to the axis A. FIG. 3 shows a partly sectional end view of FIG. 2 in such a manner that the angle drive 6a formed as a worm gear 16 is clearly visible. This shows how the drive gear 16 and the threaded ring 7 mesh. Moreover, the aperture 9 for a drive tool in the wall of the rear part 12 is shown here.

Figure 4:
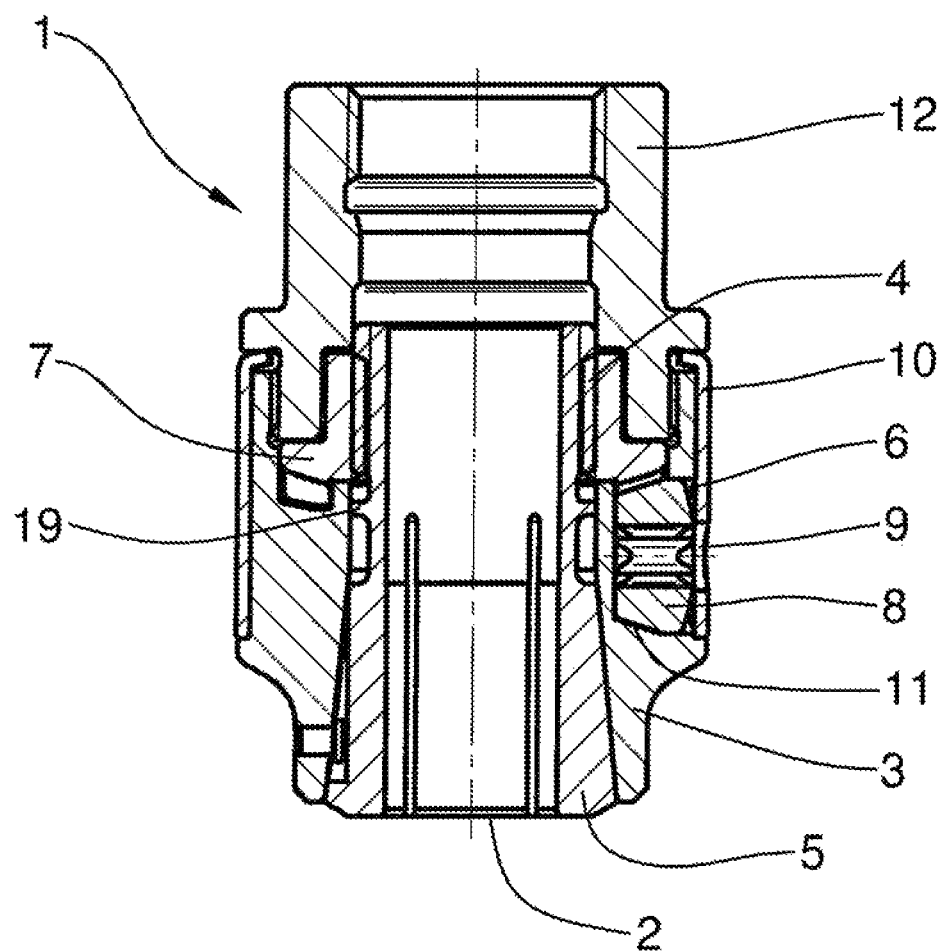
FIG. 4 is a view like FIG. 1 of a third embodiment of the chuck.

FIG. 4 shows the gear seat 11 in the chuck body 3 with as in FIG. 1 the angle drive 6 formed as a bevel-gear drive. Here, the gear sleeve 10, which is a separate part made of a tubular piece of sheet metal, is shown to be bent radially inward at its rear end. As in FIG. 1 and likewise on its outer wall at an axial spacing from its ends, the collet 5 has the rib 19. The screwthread 4 of the collet 5 has an axial length that exceeds that of the part of the threaded ring 7 that engages with the screwthread 4.

Figure 5:
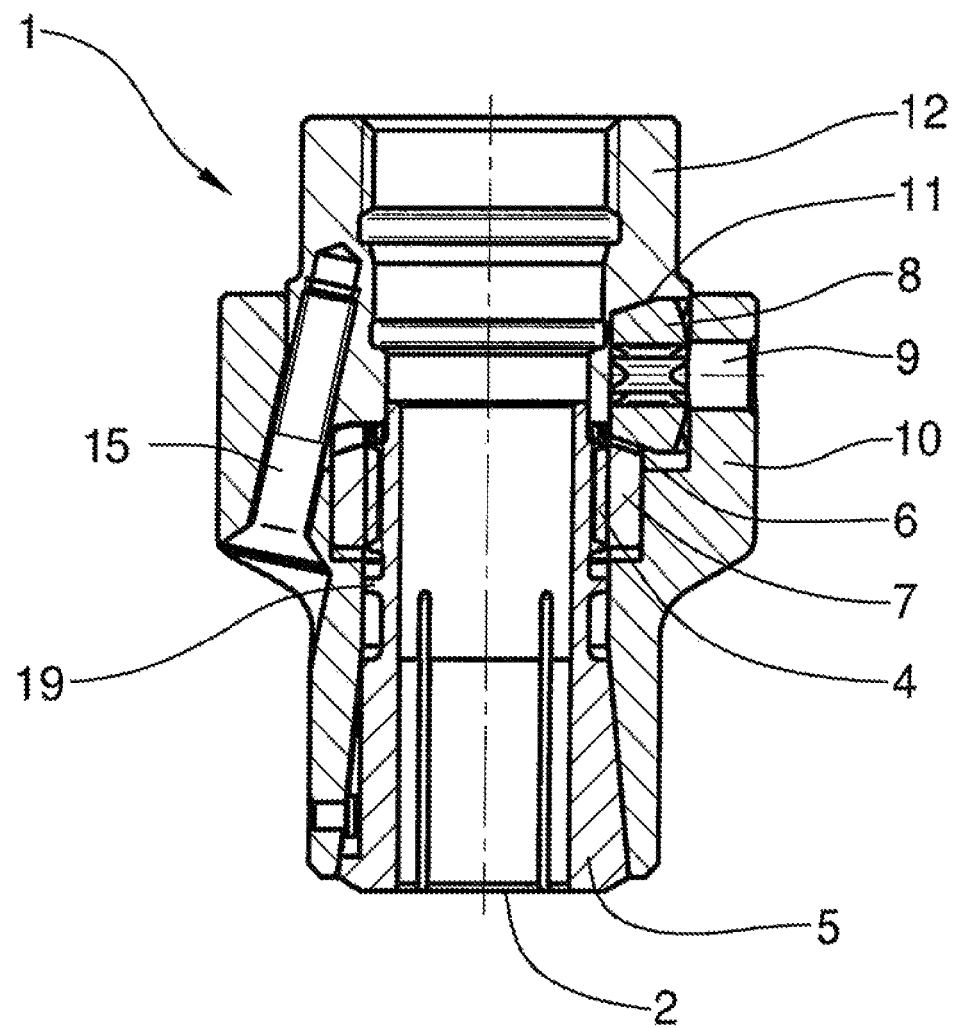
FIG. 5 is another view like FIG. 1 of a fourth embodiment of the chuck.
Figure 7:
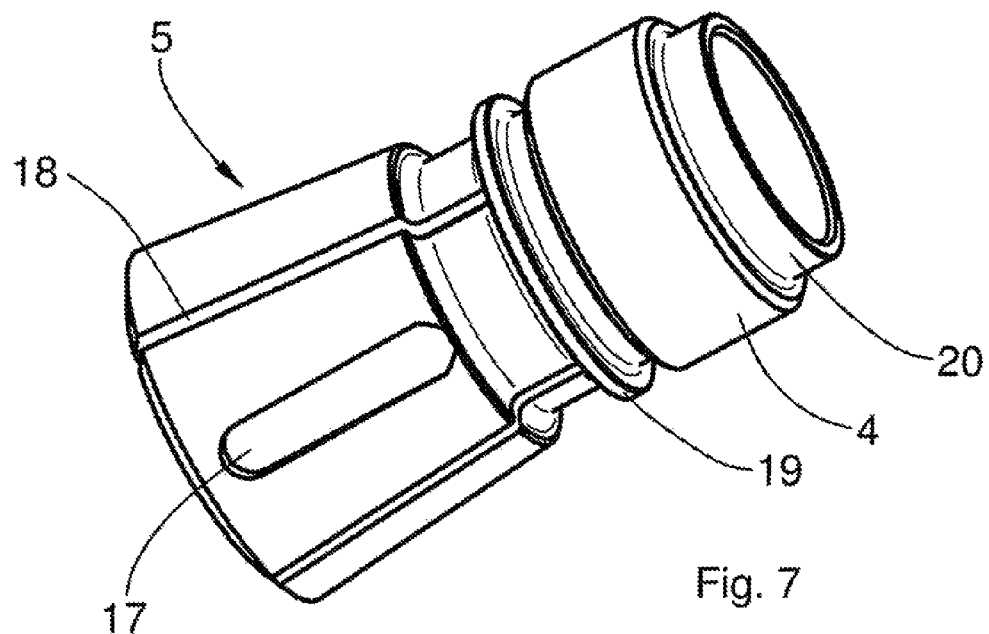
FIG. 7 is a view like FIG. 6 of another collet according to the invention.

FIG. 5 shows an alternative embodiment of the invention that corresponds to FIG. 1 and where the gear sleeve 10 is unitarily formed with the chuck body 3 as a rearwardly projecting collar surrounding a front end of the separate rear part 12 of the body 3. Again, the angle drive 6 is a bevel-gear drive and the collet 5 is the same as in FIG. 1. One or more fasteners 15 extend rearwardly back through the chuck body 3 into its separate rear part 12 to lock the chuck body 3 to the rear part 12.

Figure 6:
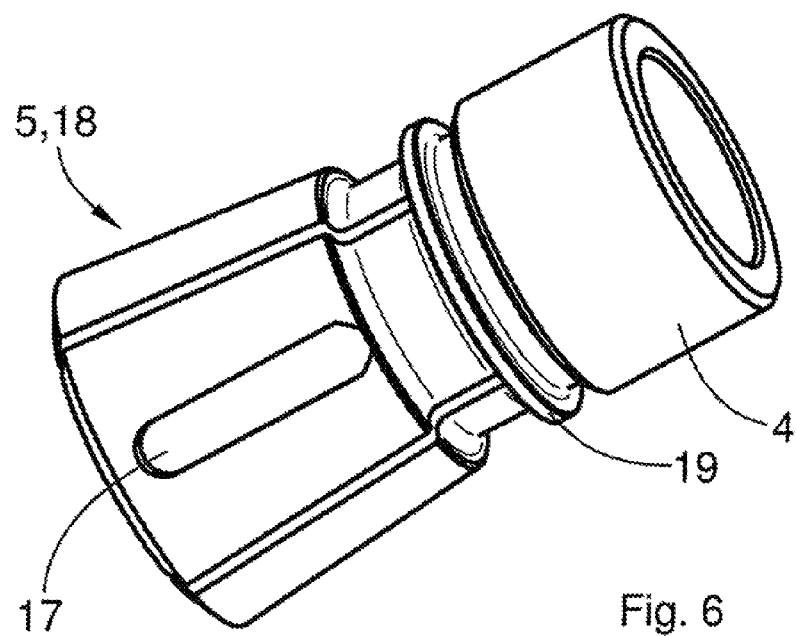
FIG. 6 is a perspective view of a clamping element formed as a collet.

FIG. 6 shows the collet 5 and the rib 19 on the outer wall at an axial spacing from the end of the collet 5 is clearly visible. The view also shows a groove 17 that locks it against rotation by fitting with a ridge or other radially inwardly project part of the chuck body 3. The screwthread 4 of the collet 5 is formed here in such a manner that it extends up to the end of the collet 5 associated with the rear part 12. As shown also in FIG. 7, the screwthread 4 is not as long as shown in FIG. 6 so that at the end facing toward the rear part 12, a collar 20 is formed that can be inserted into the rear part 12 to provide a journal allowing the collet 5 to turn on center in the chuck body 3.

In the above it is noted that the disclosure is related to a collet chuck. It would, however, be possible to replace the collet 5 with a plurality of angularly equispaced jaws riding in radially inwardly open angled guides of the body 3 and each having external teeth meshing with the screwthread 13 of the ring 7. In this case the "clamping element" of the invention would be these jaws, not the illustrated collet 5. Normally in such an arrangement angularly extending springs push the jaws angularly apart and radially outward.

I claim:

1. A chuck comprising:
    a chuck body at least generally centered on a body axis and having an axially extending hole formed with forwardly open and frustoconically forwardly flaring inner surface portion;
    a clamping element having an axially generally central and radially projecting guide rib slidable in the hole, an external screwthread, and an outer surface portion generally complementary with and engaging the inner surface portion, whereby axial rearward movement of the clamping element in the hole radially compresses the clamping element;
    a ring axially nondisplaceable in the body, having an internal screwthread engaging the external screwthread of the clamping element, and having external gear teeth, whereby rotation of the ring axially shifts the clamping element in the body, the body being formed with a radially outwardly open cavity seat in which some of the teeth of the ring are exposed;
    a gear fitted in the seat, meshing with the teeth of the ring, and rotatable about a drive axis not parallel to the body axis to rotate the ring about the body axis; and
    a sleeve removably mounted on and separate from the chuck body, extending axially across and covering the seat to retain the gear therein, and formed with a throughgoing aperture through which a tool can fit to engage and rotate the gear.

2. The chuck defined in claim 1, wherein the chuck body has a front part formed with the forwardly flaring inner surface portion and a rear part axially rearward therefrom.

3. The chuck defined in claim 2, wherein the sleeve has a rim that is bent radially inward and captured axially between the parts of the chuck body.

4. The chuck defined in claim 2, wherein the seat is formed in the rear part.

5. The chuck defined in claim 1, wherein the gear is a bevel gear and the teeth of the ring are formed on an axial end face of the ring.

6. The chuck defined in claim 1, wherein the gear is a worm gear and the teeth of the ring are formed on a radial outer surface of the ring.

7. The chuck defined in claim 1, wherein the clamping element is a tubular one-piece collet formed with axially extending slots.

8. The chuck defined in claim 7, wherein the slots are filled with a compressible elastomer.

9. The chuck defined in claim 1, wherein the clamping element has a rear end formed with a rearwardly projecting guide collar fitted in and axially slidable in the hole.

10. The chuck defined in claim 1, wherein the screwthread of the element is axially longer than the threaded ring.

11. The chuck defined in claim 1, wherein the seat is a radially outwardly open cavity having an outer surface centered on the drive axis.

12. The chuck defined in claim 11, wherein the drive axis is perpendicular and radial of the body axis.

13. The chuck defined in claim 11, wherein the outer surface is frustoconical and the gear is a bevel gear, the teeth of the ring being bevel-gear teeth complementary to those of the gear.

14. The chuck defined in claim 11, wherein the aperture is centered on the drive axis and is of smaller diameter than the seat.

\* \* \* \* \*